United States Patent [19]
Schultz et al.

[11] 3,827,681
[45] Aug. 6, 1974

[54] DAMPING SYSTEM ESPECIALLY SUITABLE FOR VEHICLE SUSPENSIONS

[75] Inventors: John Clayson Schultz, Buffalo; Tsu Pin Shyu, Cheektowaga, both of N.Y.

[73] Assignee: Houdaille Industries, Inc., Buffalo, N.Y.

[22] Filed: Jan. 29, 1973

[21] Appl. No.: 327,271

[52] U.S. Cl. .................................. 267/8 B, 267/67
[51] Int. Cl. ...................... B60g 15/04, B60g 15/06
[58] Field of Search ................ 267/8 B, 8 C, 15, 67

[56] References Cited
UNITED STATES PATENTS
2,819,062  1/1958  Tack ...................................... 267/8
3,333,864  8/1967  Allison et al. ......................... 267/67

*Primary Examiner*—James B. Marbert
*Attorney, Agent, or Firm*—Simpson, Van Santen, Steadman, Chiara & Simpson Hill, Gross

[57] ABSTRACT

A damping system especially suitable for, but not limited to, vehicle suspensions is operable in a full range from low amplitude high frequency movements between relatively movable members to high amplitude low frequency movements between the members. The system includes a damper especially effective to control the high amplitude low frequency movements and having means for mounting in on one of the members, and a device tuned to damp the low amplitude high frequency movements having means for mounting in on the other of the members and being connected in series with the damper.

14 Claims, 4 Drawing Figures

DAMPING SYSTEM ESPECIALLY SUITABLE FOR VEHICLE SUSPENSIONS

The present invention relates to the art of damping movements between relatively movable members, and is more particularly concerned with a damping system that will afford a wide range of control.

As is well known, when an undamped mass elastic system is disturbed at a natural frequency, the resultant disturbances to the mass could theoretically continue to increase to infinity. Although such a system may inherently provide some damping it is often not sufficient to provide the necessary control so that some especially devised damping means must be provided across the resilient member.

By way of example a vehicle suspension system may be referred to such as in a railroad car and more particularly a passenger car, although numerous and varied other damped mass elastic systems could be referred to. Customarily the vehicle body is mounted, that is, suspended, on an undercarriage or trucks by means of springs. In the course of running of the vehicle, not only vertical but also lateral low amplitude high frequency relative movements tend to occur between the vehicle body and the undercarriage, but also high amplitude low frequency movements or vibrations occur. Rather successful control of the high amplitude low frequency movements has heretofore been accomplished. However a persistent problem has existed in the low amplitude high frequency movement end of the range or spectrum of movements or vibrations. In passenger vehicles such as railroad cars, the comfort index is severely affected by the low amplitude high frequency movements or vibrations. The latter vibrations are also highly detrimental in other environments such as in the suspensions or supports for electronic gear, and the like.

An important object of the present invention is to overcome the foregoing and other disadvantages, deficiencies, inefficiencies, shortcomings and problems in damping systems and to attain important improvements and advantages in a system which will efficiently control damping throughout a whole range from low amplitude high frequency to high amplitude low frequency.

Another object of the invention is to provide a new and improved damping system in which respective components for predetermined motion control range are automatically operable in this system to control the movements for which respectively designed.

A further object of the invention is to provide a new and improved series operable wide range damping system.

Still another object of the invention is to provide a new and improved series operable hydraulic damper and tunned spring damper system.

Yet another object of the invention is to provide a new and improved low amplitude high frequency damping device.

A still further object of the invention is to provide a new and improved wide range damping system especially suitable for controlling vehicle suspensions.

Other objects, features and advantages of the invention will be readily apparent from the following description of a preferred embodiment thereof, taken in conjunction with the accompanying drawings although variations and modifications may be effected without departing from the spirit and scope of the novel concepts embodied in the disclosure, and in which.

Figure 1:
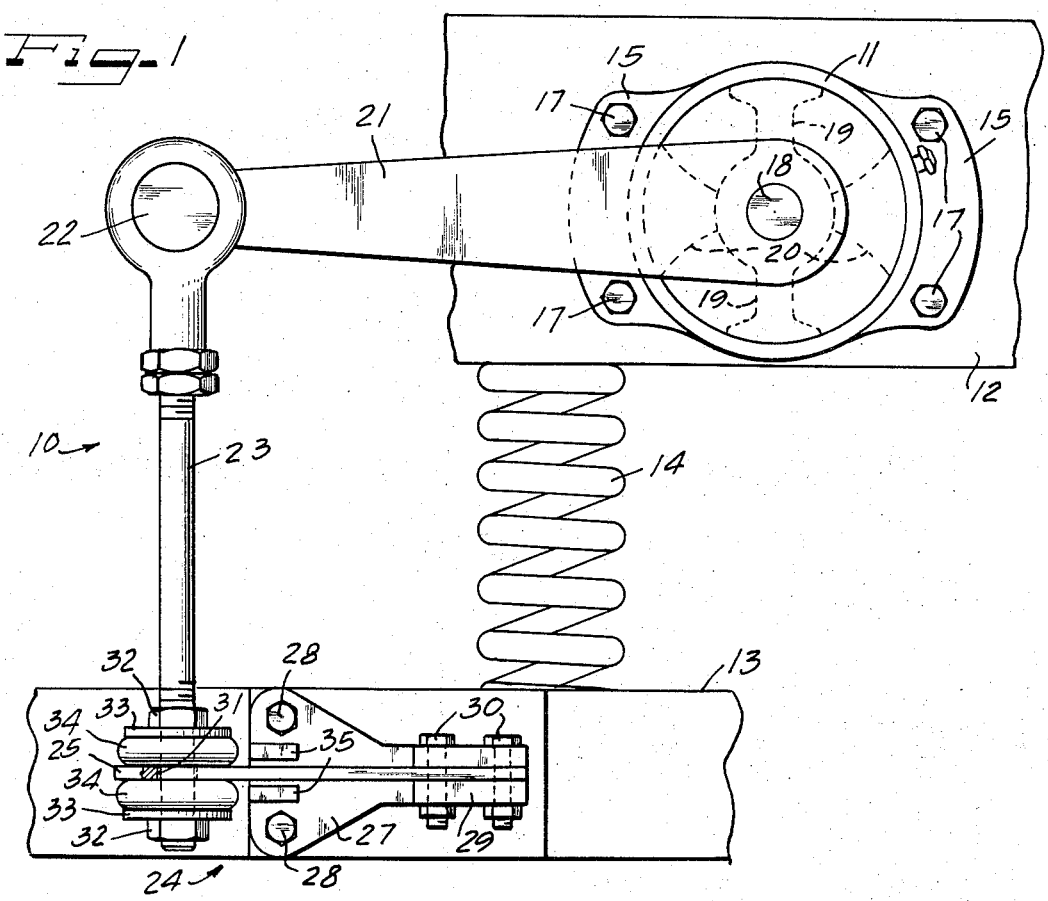
FIG. 1 is a side elevational view of a damping system embodying features of the invention.

In a typical damping system 10 embodying features of the invention and as depicted in FIG. 1, a damper 11 is provided which is especially effective to control high amplitude low frequency movements between relatively movable members 12 and 13 which in this instance and as is generally customary are resiliently connected as by means of one or more suspension springs 14. Means for attaching the damper 11 to the member 12 comprise flanges 15 on the housing of the damper and attachment screws or bolts 17 securing the flanges to the member 12. In this instance the damper 11 is of the hydraulic rotary shock absorber type of any preferred construction operating on the well known principle of a wing shaft 18 provided with vanes 19 functioning in the oscillations of the wing shaft to displace hydraulic fluid within the damper relative to abutments 20 fixed within the working chamber, suitable restricted orifice means being provided to throttle the hydraulic displacement and thereby absorb energy and damp the relative movements of the members to and between which the damper is connected.

A damping connection between the damper 11 and the other relatively movable member 13 is effected by means of a radial lever arm 21 fixedly attached to the wing shaft 18 and connected at its distal end by means of a pivotal connection 22, in this instance preferably a ball joint, to a link 23 adapted at its distal end and to be connected to the member 13.

For the purpose of damping low amplitude high frequency movements by and between the members 12 and 13, a tuned resilient damping device 24 is connected in series with the damper 11, herein by having the device mounted on the member 13 attached to the link 23 to complete the connection between the damper 11 and the member 13. According to the present invention, the device 24 includes as its principal component a cantilever bar beam spring 25 comprising an elongated resilient beam having a geometrical dimension and a modulus of elasticity such that the resulting stiffness of the beam exhibits the desired proportion to the spring rate of the main suspension spring structure 14 of the suspension assembly with which associated. In a desirable construction, the spring 25 may be a spring steel bar for heavy duty applications, but may be a bar made from any other desirable material such as fiberglass or the like for lighter duty purposes. Means for connecting the device 24 to the member 13 comprise a bracket 27 secured as by means of bolts 28. One end portion of the spring 25 is fixedly secured to the bracket 27 while the opposite end portion is connected to the link 23. A slotted boss 29 on the bracket 27 receives the fixed end portion of the spring 25 which is secured fixedly thereto as by means of bolts 30. From the boss 29, the spring 25 extends freely to its connection with the like 23, being provided for this purpose with an aperture 31 through which the associated end portion of the link extends. Means securing the link 23 to the spring 25 includes clamping nuts 32 threadedly engaged on the link and pressing respective washers 33 into clamping engagement with rubber bushings 34 on each face of the spring bar, thereby providing a flexible joint with the spring. Through this arrangement the spring 25 serves as a damper for low amplitude high frequency relative movements of the members 12 and 13, and the damper 11 can be adjusted to operate with maximum efficiency to damp the high amplitude low or natural frequency relative movements of the members. In other words, the spring 25 serves as a low rate spring in series with the damper 11 which is adapted to operate at a high spring rate with hydraulic damping.

Means are provided for, in effect, cutting out or disabling the cantilever spring during high amplitude, low frequency relative movements of the members 12 and 13. For this purpose, rigidly fixed stops 35 are provided on the bracket 27 in suitable slightly spaced relation to the opposite faces of the cantilever spring a substantial distance from the mounting boss 29 and preferably as close as practicable to the free end of the bar and the joint with the link 23. Thereby, during high amplitude relative movements of the members 12 and 13, the spring 25 contacts the stops 35, and in effect becomes a solid connecting beam and automatically converts the device into a rigid connection between the member 13 and the damper 11 through the link 23, so that the damper 11 will function efficiently to damp high amplitude low frequency movements between the members 12 and 13. Through this arrangement, there is automatic transition or ratio changing between the low amplitude high frequency damping and the high amplitude low frequency damping capabilities of the damping system 10.

Figure 2:
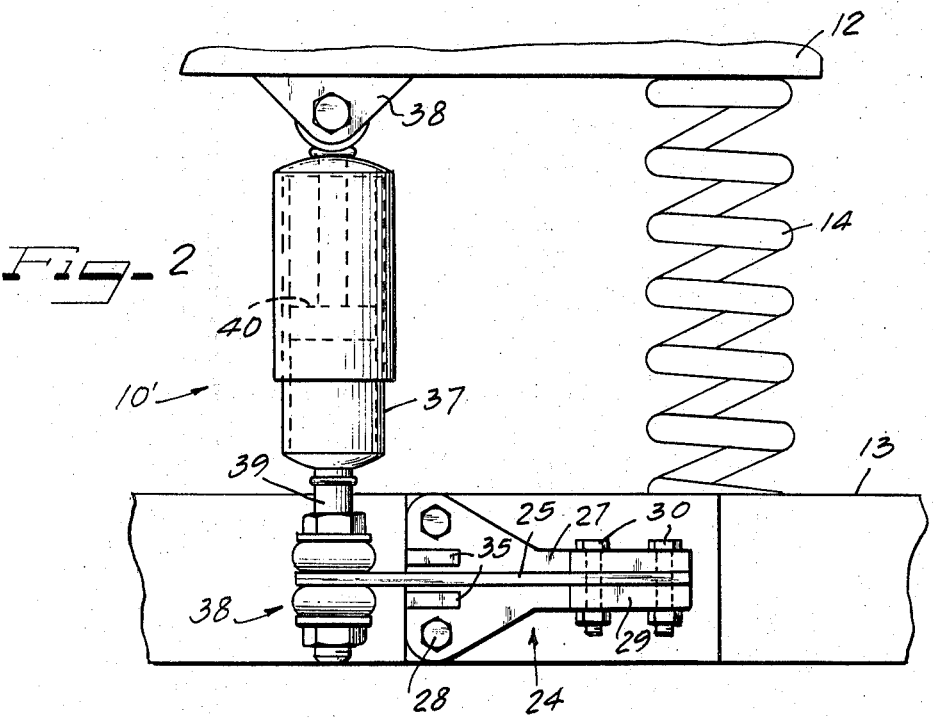
FIG. 2 is a side elevational view of a similar, slightly modified damping system.

Having reference to FIG. 2, a system 10' is depicted utilizing a rectilinear or telescopic shock absorber 37 connected at one end as by means of a bracket 38 to the member 12 and having at its opposite end a stem 39 which is connected by means of a flexible joint 38 similarly as in FIG. 1, to the cantilever damping spring 25 of the damping device 24 which is the same as in FIG. 1. The damper 37 functions on the well known principle of displacement of hydraulic fluid through restricted orifice means between opposite end portions of a working chamber within a cylinder by action of a piston and piston rod assembly 40. If preferred, of course, the damper 37 may be a direct acting friction absorber. Whichever preferred form of shock absorber is employed, it will operate in the system 10' to damp high amplitude low or natural frequency movements or vibrations between the members 12 and 13 while the damping device 24 will damp the low amplitude high frequency vibrations or movements automatically and alternatively to the operation of the damper 37.

By way of example, an important use for the damping system 10, or if preferred the damping system 10', is in ride control in a vehicle suspension system, and more particularly in railroad passenger cars, although it must be remembered that the system may be utilized in any damped mass elastic system where similar conditions exist in operation.

In the particular environment of a railroad passenger car suspension system, the damping system of the present invention is advantageous in reducing the transmission of track-induced disturbances to the car body from the running gear over an entire frequency range to a level below the amplitude profile which is established as having a passenger comfort index number of 1. The life of various components of the railroad car is substantially prolonged by reason of the reduction in vibratory forces. The loads on the dampers are also reduced thereby increasing their life. Improved safety of operation is achieved by reason of more stable operation in the railroad cars so equipped.

Use of pure damping by means of dampers 11 or 37, as the case may be, in railroad passenger car operation even with as much compromise as is tolerable between the damping level at the natural frequency and that which ensues at high frequency in track-induced disturbances cannot satisfy the whole track-induced vibration frequency range. Failure to eliminate the high frequency disturbances poses a major problem in the criteria for passenger comfort and is a major cause of railway passenger fatigue in rail travel. By providing for low amplitude high frequency damping in the system according to the present invention, the passenger comfort index is greatly improved.

Figure 3:
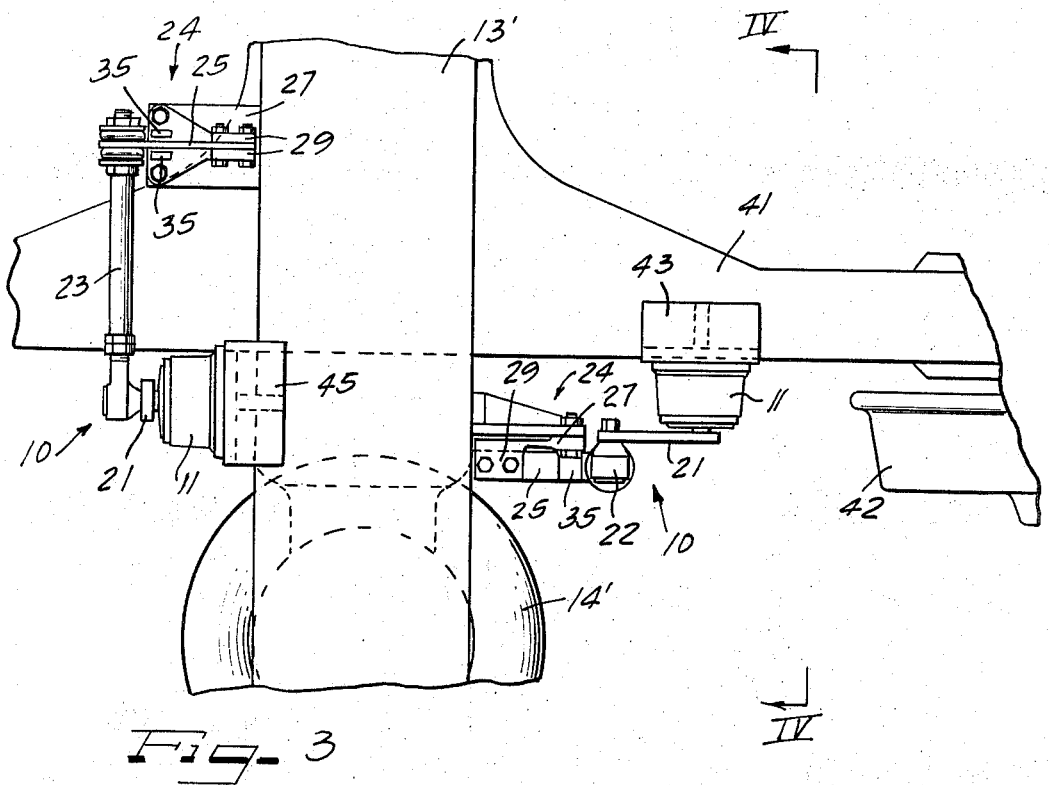
FIG. 3 is an illustrative fragmentary plan view of a railway car suspension embodying the damping system of the present invention.
Figure 4:
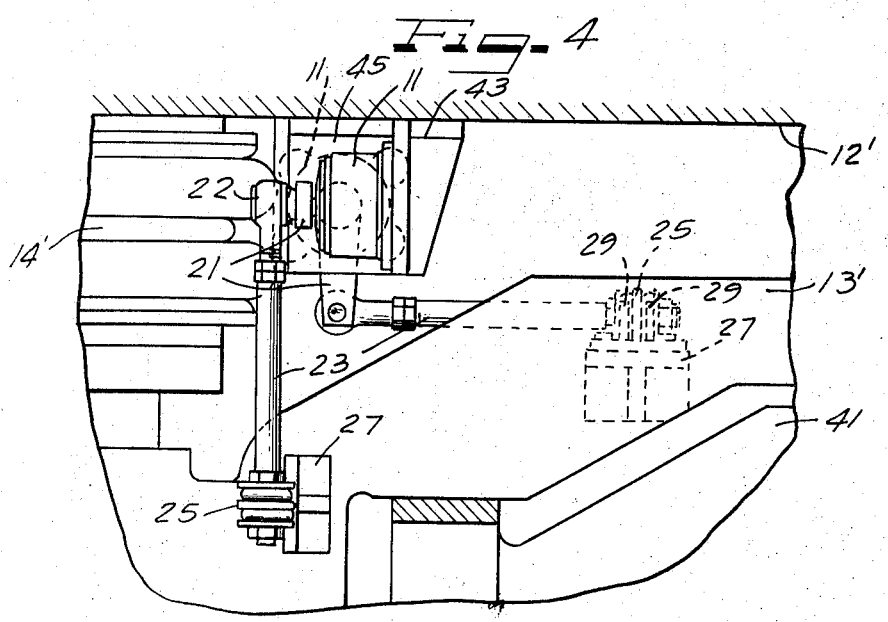
FIG. 4 is a vertical sectional view taken substantially along the line IV—IV of FIG. 3.

By way of example in FIGS. 3 and 4, installation of the damping system 10 for both vertical damping and lateral damping is shown in respect to a railway car. In such a car a truck frame 41 is supported by wheels 42 for running along a track, as is customary, and supports a bolster 13' which corresponds to the member 13 of FIG. 1. On the bolster is supported by spring means 14' a car body 12' corresponding to the member 12 in FIG. 1.

Vertical damping is effected by the system 10 shown at the right side of the bolster 13' in FIG. 3, with the damper 11 fixedly mounted on a depending bracket 43 rigid with the bottom of the car body 12' and spaced a suitable distance from the bolster 13'. From the vertical damping damper 11 the wing shaft arm 21 extends horizontally toward the bolster, and the link 23 extends vertically downwardly to the cantilever spring 25 of the damping device 24 the bracket of which is fixedly secured to the adjacent side of the bolster 13'. This controls vertical modes of vibration which are a result of irregularities of the track surface along which the car runs.

Lateral modes of vibration which are a result of irregularities of the wheel coning profile on surfaces of the rails are damped by the system 10 shown at the left in FIG. 3, having the damper 11 mounted on a depending rigid bracket 45 on the underside of the car body in a manner to have the wing shaft arm 21 of the damper project downwardly to connection with the link 23 which extends horizontally inwardly to connect with the cantilever spring 25 of the associated damping device 24 the bracket 27 of which is secured fixedly to the adjacent side of the bolster 13'.

For thorough suspension system control the damping units 10 for both vertical and lateral damping should be mounted in association with each bolster of the car, and for complete control such damping systems should be supplied in association with each opposite end portion of each of the bolsters.

From the foregoing it will be apparent that the stops 35 allow a relationship of the spring rate of 14 the cantilever spring 25 and the suspension spring 14, that is not possible in conventional elastically mounted dampers. The stops allow the rate of the spring 25 to be low resulting in the most desirable condition at high frequency low amplitude, and under large amplitude low frequency the spring 25 is effectively taken out of the system. Therefore, the desired control of resonant oscillation and high frequency disturbances can be chosen without consideration to each other.

It will be understood that variations and modifications may be effected without departing from the spirit and scope of the novel concepts of this invention.

We claim as our invention:

1. A damping system operable in a full range from high amplitude low frequency movements between relatively movable members to lower amplitude high frequency movements between the members, comprising:

a damper especially effective to control said high amplitude low frequency movements and having means for mounting it on one of said members; and a spring bar device connected in series with said damper and tuned to damp said low amplitude high frequency movements and having means for mounting it on the other of said members.

2. A system according to claim 1, including means for automatically converting said device into a substantially rigid connection between said damper and said other of said members during said high amplitude low frequency relative movements.

3. A system according to claim 2, wherein said device comprises a spring bar element mounted for resilient flexing damping vibration transverse to its longitudinal axes, and said last-mentioned means comprising rigid fixed stop structure normally spaced sufficiently from said bar element to permit said damping vibrations and engageable by the bar during said high amplitude low frequency relative movements.

4. A system according to claim 1, wherein said device comprises a cantilever spring bar having a free end portion connected to said damper and a fixed end portion secured to said means for mounting the device on said other member.

5. A system according to claim 4, including a rigid stop in adjacent spaced relation to each of opposite faces of the cantilever bar adjacent to its free end for stopping movements of the bar during said high amplitude low frequency relative movements of said members.

6. A system according to claim 1, wherein said damper comprises a rotary shock absorber having a shaft, an arm extending radially from said shaft, and a link connecting said arm with said spring bar device.

7. A system according to claim 1, wherein said damper comprises a rectilinear shock absorber connected on its axis to and between said first member and said device.

8. A system according to claim 1, in combination with a vehicle wherein said one member comprises a vehicle body, said other member comprising part of the running gear for the vehicle, and spring means supporting the vehicle body on the running gear.

9. A combination according to claim 8, wherein said vehicle comprises a railway car, said part of the running gear comprising a bolster, and said spring means supporting the car body on the bolster.

10. A combination according to claim 9, wherein said damper and said device are respectively oriented on and relative to said car body and said bolster to damp relative vertical movements of the body and bolster, and a second substantially identical damping system having a damper for controlling high amplitude low frequency relative movements and including means connecting it to the car body and a spring bar damping device for damping low amplitude high frequency relative movements having its mounting means attached to the bolster, said damper and damping device of the second damping system being oriented relative to one another and to the car body and the bolster for damping lateral relative movements of the car body and bolster.

11. In a damping device especially suitable to be tuned to damp low amplitude high frequency movements between relatively movable members:

a spring bar;

fulcrum means for securing one end portion of the bar fixedly to one of the members; and means for connecting said bar at a point remote from said fulcrum means to the other of the members.

12. A device according to claim 11, including means for automatically converting said bar into a rigid connection between said one member and said means for connecting the bar with said other member.

13. A device according to claim 12, said automatic converting means comprising a pair of rigid stops located in normally spaced adjacency to said bar but engaged by the bar during high amplitude low frequency relative movements of said members.

14. A device according to claim 11, comprising a mounting bracket, means for securing the mounting bracket fixedly to said first member, a fulcrum boss rigid with said bracket, means securing said one end portion of the bar rigidly to the fulcrum boss, and a pair of rigid stops on said bracket in narrowly spaced relation to said bar adjacent to but spaced from the free end of the bar and said means for connecting the bar to said other member.

* * * * *